US008719709B2

(12) United States Patent
Jogand-Coulomb et al.

(10) Patent No.: US 8,719,709 B2
(45) Date of Patent: May 6, 2014

(54) METHOD FOR INTERFACING WITH A MEMORY CARD TO ACCESS A PROGRAM INSTRUCTION

(75) Inventors: Fabrice Jogand-Coulomb, San Carlos, CA (US); Robert C. Chang, Danville, CA (US)

(73) Assignee: SanDisk Technologies Inc., Plano, TX (US)

( * ) Notice: Subject to any disclaimer, the term of this patent is extended or adjusted under 35 U.S.C. 154(b) by 302 days.

(21) Appl. No.: 11/509,978

(22) Filed: Aug. 25, 2006

(65) Prior Publication Data

US 2008/0086693 A1    Apr. 10, 2008

(51) Int. Cl.
*G06F 3/00* (2006.01)
(52) U.S. Cl.
USPC ........ 715/741; 715/726; 715/744; 455/186.1; 365/185.33
(58) Field of Classification Search
USPC ........................ 715/700, 741, 726; 455/186.1; 365/185.33; 711/103, 115
See application file for complete search history.

(56) References Cited

U.S. PATENT DOCUMENTS

| 5,041,967 | A  | * | 8/1991  | Ephrath et al. ................ 715/825 |
| 5,396,558 | A  | * | 3/1995  | Ishiguro et al. ................. 705/67 |
| 6,362,893 | B1 | * | 3/2002  | Francis et al. ............... 358/1.14 |
| 6,594,484 | B1 | * | 7/2003  | Hitchings, Jr. ............. 455/414.1 |
| 6,607,136 | B1 | * | 8/2003  | Atsmon et al. ................ 235/492 |
| 6,687,823 | B1 | * | 2/2004  | Al-Salqan et al. ............ 713/167 |
| 6,990,471 | B1 | * | 1/2006  | Rajaram ......................... 705/64 |
| 7,058,180 | B2 | * | 6/2006  | Ferchichi et al. ............. 380/247 |
| 7,114,075 | B1 | * | 9/2006  | Yasuda et al. ................. 713/182 |
| 2001/0021956 | A1 | * | 9/2001  | Okamoto et al. ............. 710/102 |
| 2001/0054148 | A1 | * | 12/2001 | Hoornaert et al. ............ 713/172 |
| 2002/0046189 | A1 | * | 4/2002  | Morita et al. ................... 705/67 |
| 2002/0051167 | A1 | * | 5/2002  | Francis et al. ............... 358/1.14 |
| 2002/0066042 | A1 | * | 5/2002  | Matsumoto et al. .......... 713/202 |
| 2002/0128929 | A1 | * | 9/2002  | Urabe ............................ 705/26 |
| 2002/0133713 | A1 | * | 9/2002  | Fieschi et al. ................. 713/200 |
| 2002/0147821 | A1 | * | 10/2002 | Ebihara et al. ................ 709/229 |
| 2002/0193142 | A1 | * | 12/2002 | Stavenow et al. ............. 455/556 |
| 2003/0107597 | A1 |   | 6/2003  | Jameson |
| 2003/0173400 | A1 | * | 9/2003  | Morita et al. ................. 235/380 |
| 2003/0212894 | A1 | * | 11/2003 | Buck et al. .................... 713/184 |
| 2003/0226030 | A1 |   | 12/2003 | Hurst et al. |
| 2004/0010656 | A1 | * | 1/2004  | Chiao et al. ................... 711/103 |
| 2004/0039860 | A1 | * | 2/2004  | Mills et al. .................... 710/301 |

(Continued)

FOREIGN PATENT DOCUMENTS

JP        10289084 A    * 10/1998    ................ G06F 3/14
JP        2005085023        3/2005

OTHER PUBLICATIONS

Wang et al., "Using IC Cards to Remotely Login Passwords without Verification Tables", 2004, IEEE, Proceedingsof the 18th Inernational Conference on Advanced Information Networking and Application, pp. 1-6.*

(Continued)

*Primary Examiner* — Shen Shiau
(74) *Attorney, Agent, or Firm* — Brinks Gilson & Lione

(57) ABSTRACT

A method for interfacing with a memory card is provided. In this method, a selection of a program instruction is provided and the program instruction associated with the selection is read from the memory card. The program instruction thereafter is executed. Systems and computing devices for interfacing with the memory card also are described.

12 Claims, 9 Drawing Sheets

(56) References Cited

U.S. PATENT DOCUMENTS

| | | | |
|---|---|---|---|
| 2004/0073802 A1* | 4/2004 | Seol | 713/183 |
| 2005/0033994 A1* | 2/2005 | Suzuki | 713/202 |
| 2005/0086421 A1* | 4/2005 | Nassar | 711/103 |
| 2005/0182973 A1* | 8/2005 | Funahashi et al. | 713/202 |
| 2005/0226170 A1* | 10/2005 | Relan et al. | 370/254 |
| 2006/0080545 A1* | 4/2006 | Bagley | 713/183 |
| 2006/0174105 A1* | 8/2006 | Park | 713/155 |
| 2006/0190941 A1* | 8/2006 | Kobayashi et al. | 717/174 |
| 2007/0050638 A1* | 3/2007 | Rasti | 713/186 |
| 2007/0108272 A1* | 5/2007 | Kamata | 235/382 |
| 2007/0234421 A1* | 10/2007 | Ogino et al. | 726/19 |
| 2007/0236453 A1* | 10/2007 | Maynard et al. | 345/158 |
| 2007/0250632 A1* | 10/2007 | Nomura et al. | 709/227 |
| 2007/0250920 A1* | 10/2007 | Lindsay | 726/7 |
| 2007/0255960 A1* | 11/2007 | Hon et al. | 713/185 |
| 2007/0294079 A1* | 12/2007 | Ishikura et al. | 704/3 |
| 2008/0052686 A1* | 2/2008 | Jogand-Coulomb et al. | 717/139 |
| 2008/0072060 A1* | 3/2008 | Cannon et al. | 713/185 |
| 2008/0072061 A1* | 3/2008 | Cannon et al. | 713/185 |
| 2008/0086693 A1* | 4/2008 | Jogand-Coulomb et al. | 715/744 |
| 2009/0049307 A1* | 2/2009 | Lin | 713/185 |

OTHER PUBLICATIONS

International Search and Written Opinion Report for corresponding PCT Application Serial No. PCT/US2007/017841, dated Feb. 12, 2008 (11 pages).

Rankin, Kyle, "Knoppix Hacks", Retrieved from http://proquest.saraibooksonline.com/0596007876, printed on Dec. 13, 2007 (18 pages).

Office Action directed against U.S. Appl. No. 11/510,297, Aug. 7, 2008, 9 pages.

* cited by examiner

METHOD FOR INTERFACING WITH A MEMORY CARD TO ACCESS A PROGRAM INSTRUCTION

CROSS-REFERENCES TO RELATED APPLICATIONS

This application is related to U.S. patent application Ser. No. 11/510,297, filed on Aug. 25, 2006, and entitled "System and Computing Device for Interfacing with a Memory Card to Access a Program Instruction," the disclosure of which is incorporated herein by reference.

FIELD OF THE INVENTION

The present invention relates generally to memory technologies and, more particularly, to methods and systems for interfacing with a memory card to access a program instruction.

BACKGROUND

Some applications stored in a computing device cannot be modified or updated once the applications are compiled and loaded into the computing device. For example, mobile phones with resource-constrained environments (e.g., small memory, slow processors, etc.) include operating systems that are compact and have limited functionalities. Such operating systems typically cannot be modified because the operating systems do not include update functionalities and/or cannot be modified for security purposes, such as to prevent viruses from modifying the operating systems.

Such mobile phones therefore cannot load patches to update their operating systems with new functionalities. For example, the menus associated with an operating system cannot be changed. In another example, to interface with a secure memory card, the operating system is preprogrammed to transmit a set of commands to the secure memory card. Such commands include, for example, a command to retrieve information associated with the secure memory card for use in digital rights management of data. A new secure memory card, for example, may include new functionalities that require the transmittal of a different set of existing commands. Since the operating system of the mobile phone cannot be updated, the mobile phone cannot support the new set of existing commands. As a result, the mobile phone cannot be adapted to interface with new or unsupported secure memory cards.

As a result, there is a further need for continuing efforts to improve the functionalities of computing devices.

SUMMARY

Various embodiments of the present invention provide methods, systems, and/or computing devices for interfacing with a memory card. It should be appreciated that the embodiments can be implemented in numerous ways, including as a method, a circuit, a system, or a device. Several embodiments of the present invention are described below.

In accordance with an embodiment of the invention, a method for interfacing with a memory card is provided. In this method, a selection of a program instruction is provided and the program instruction associated with the selection is read from the memory card. Thereafter, the program instruction is executed.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods, systems, and/or computing devices for interfacing with a memory card to access program instructions. In general, the program instructions are stored in a memory card. As will be explained in more detail below, in some embodiments, a selection of one or more program instructions are provided. Thereafter, the one or more program instructions associated with the selection are read from the memory card and executed.

Figure 1:
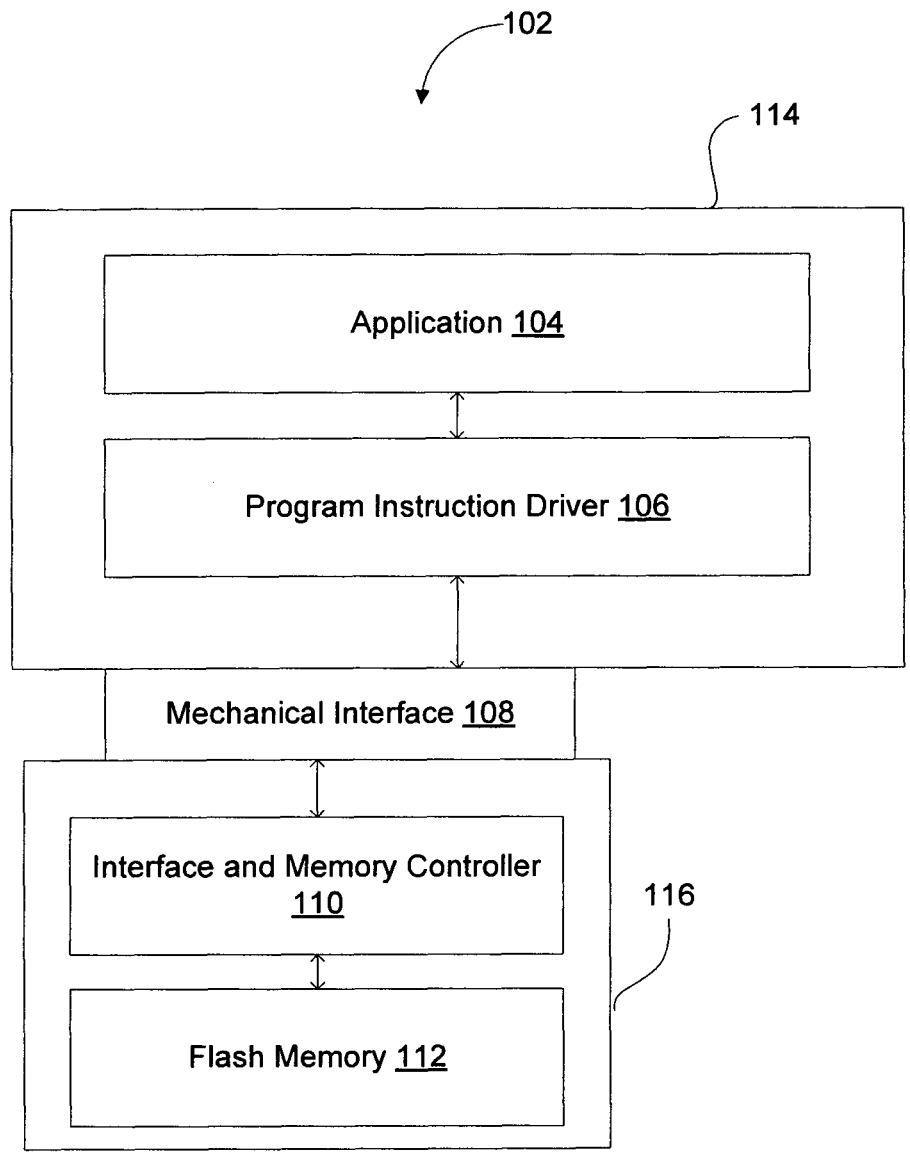
FIG. 1 is a simplified block diagram of an example of a system for interfacing with a memory card, in accordance with an embodiment of the invention.

FIG. 1 is a simplified block diagram of an example of a system for interfacing with a memory card, in accordance with an embodiment of the invention. As shown in FIG. 1, system 102 includes host computing device 114 and memory card 116. Host computing device 114 is connected to memory card 116 and may access the memory card to store or retrieve data. Memory card 116 is removably connected to host computing device 114 through mechanical interface 108 such as pin and/or socket connectors. Memory card 116 is a memory storage device. An example of memory card 116 is a flash memory card. The flash memory card, as shown by memory card 116 of FIG. 1, may include interface and memory controller 110 and flash memory 112. Flash memory 112 comprises memory cells that store data. Examples of flash memory 112 include NOR, AND, Divided bit-line NOR (DI-NOR), Not AND (NAND), and other flash memories. In general, interface and memory controller 110 interfaces with host computing device 114 to transmit data. Interface and memory controller 110 manages the flow of data communicated to and from flash memory 112. For example, interface and memory controller 110 converts between logical addresses of data used by host computing device 114 and physical addresses of flash memory 112 in read and write operations. There are a variety of flash memory cards, examples being those sold under the trademarks Secure Digital, MultiMediaCard, MiniSD, MicroSD, CompactFlash, SmartMedia, xd-Picture Card, Memory Stick, TransFlash, and other flash memory cards. A flash memory card can also include a Universal Serial Bus (USB) flash drive with flash memory, such as flash memory 112, that is integrated with a USB interface for connecting to host computing device 114.

Host computing device 114, as will be explained in more detail below, includes a memory for storing application 104 and program instruction driver 106, and a processor for executing the application and the program instruction driver. Application 104 may include a variety of program applications. For example, application 104 may be an operating system that manages the hardware and software resources on host computing device 114. In another example, application 104 may be a multimedia player configured for playing audio and video files. Additionally, for example, application 104 may be a video game. Application 104 interfaces with program instruction driver 106 and may use the program instruction driver to access a program instruction stored in memory card 116. As will be explained in more detail below, in an embodiment, program instruction driver 106 can be configured to read a program instruction stored in memory card 116 and to execute the program instruction. Program instruction driver 106 can be associated with application 104 or can be a separate program stored in memory of host computing device 114. For example, in one embodiment, application 104 is an operating system and program instruction driver 106 is associated with the operating system. In other words, program instruction driver 106 can be integrated into the operating system.

Figure 2:
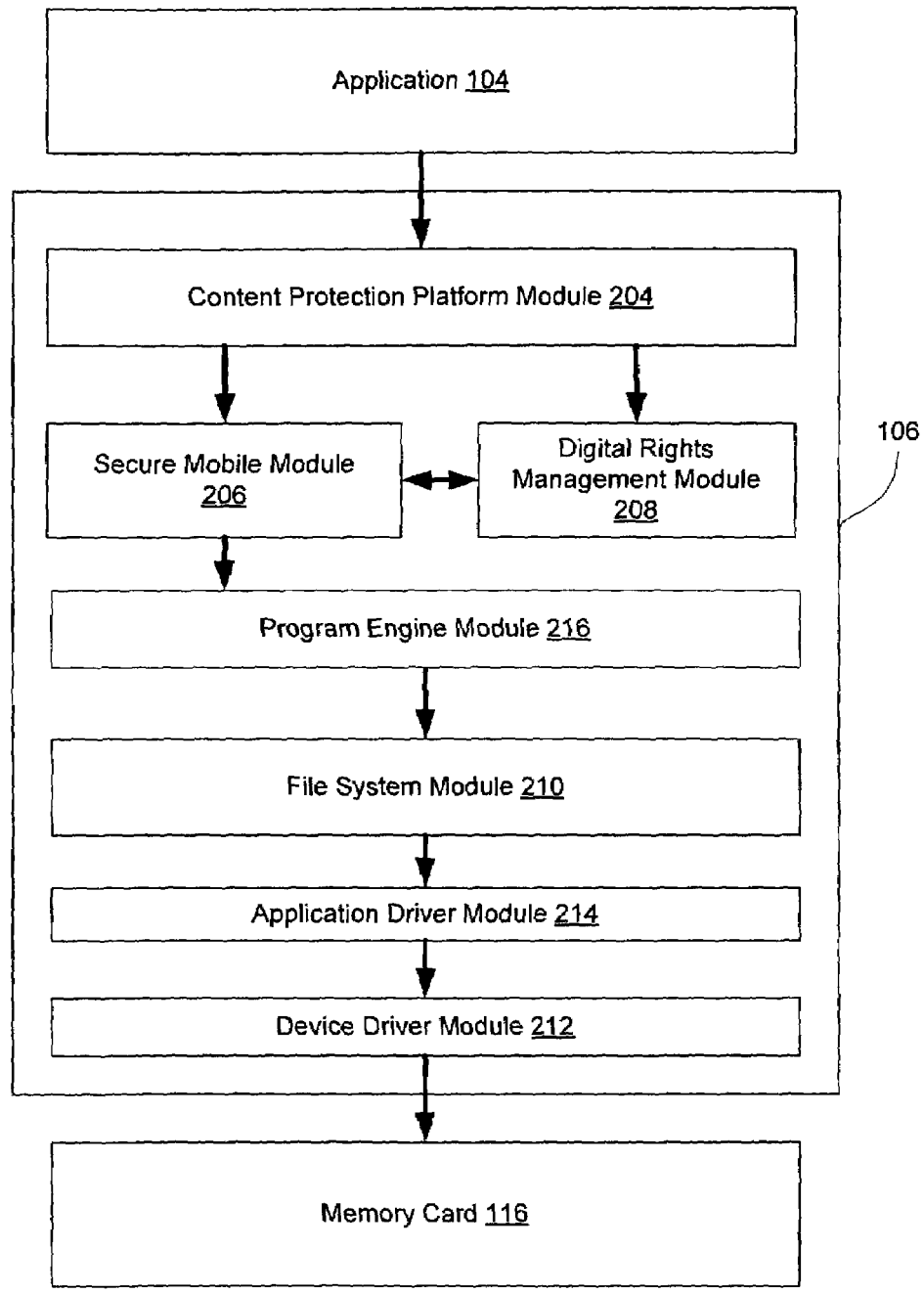
FIG. 2 is a simplified block diagram of a program instruction driver for interfacing with a memory card, in accordance with an embodiment of the invention.

FIG. 2 is a simplified block diagram of a program instruction driver for interfacing with a memory card, in accordance with an embodiment of the invention. As shown in FIG. 2, program instruction driver 106 includes content protection platform module 204, secure mobile module 206, digital rights management module 208, file system module 210, program instruction engine module 216, and device driver module 212. In general, content protection platform module 204 is a technology platform for securing data to memory card 116. There are a variety of technology platforms that may be used for securing data, an example being sold under the trademark TrustedFlash platform. Content protection platform module 204 can include a cryptographic engine and a server for validating digital rights management module 208.

In communication with content protection platform module 204 is digital rights management module 208. Digital rights management module 208 allows memory card 116 to manage the digital rights of data stored in the memory card. Content protection platform module 204 and digital rights management module 208 together provide program instruction driver 106 with secure storage and content management capabilities. For example, content protection platform module 204 and digital rights management module 208 allow secure storage of data (e.g., music files, movie files, software, and other data) stored in memory card 116 and enforcement of predefined policies for controlling access to the data.

In communication with content protection platform module 204 and digital rights management module 208 is secure mobile module 206. Secure mobile module 206, in general, provides secured transmission to and from portable host computing devices. Secure mobile module 206 can include a cryptographic engine for encryption and decryption operations. For example, secure mobile module 206 may include public key infrastructure (PKI) algorithms for encryption and authentication of electronic transmissions, thereby allowing a portable host computing device to perform, for example, secure online financial transactions. Examples of secure online financial transactions include credit card payments, one-time password authentication, mass-transit access, and other transactions.

Program instruction engine module 216, which is in communication with secure mobile module, is configured to read and execute one or more program instructions. A program instruction, in general, can be a programming language or code. Programming languages include scripts, applets, and other programming languages. A script may, for example, include a list of commands to interface and/or communicate with memory cards, operating systems, and other hardware and software applications. For example, the commands may be a basic set of instructions to read and write data to memory card 116. Other examples of scripts include JavaScript, JScript, Ch, AppleScript, Tool Command Language (Tcl), and other scripting languages. A program instruction can also include code, such as machine code, which can be directly processed by a processor. The program instruction may also be an intermediate code. In general, a programming language can be compiled into an intermediate code, such as bytecode, p-Code, and other intermediate codes. The intermediate code can then be compiled into machine code.

The execution of a program instruction may include the interpretation or compilation of the program instruction. As a result, program instruction engine module 216 may include an interpreter and/or a compiler. It should be appreciated that a compiler translates a programming instruction into another programming instruction. For example, the compiler may translate a high-level programming language, such as bytecode, into a low-level code, such as machine code. In general, an interpreter executes or runs the program instruction. Program instruction engine module 216 reads and executes the program instructions to perform computing operations. A program instruction may be used to provide additional functions to the host computing device. Examples of features include the use of a program instruction to validate memory card 116 or a host computing device (i.e., authentication) such that the host computing device can communicate with the memory card in secure mode. In another example, the program instruction may be use to load and initiate another application stored in memory card 116. In yet another example, the program instruction may be used to modify application 104 (e.g., an operating system).

In communication with program instruction engine module 216 is file system module 210. File system module 210 is configured to handle access of program instructions stored in memory card 116. For example, file system module 210 can read program instructions from memory card 116 and can transmit the program instructions to program instruction engine module 216 for execution. Application driver module 214, which is in communication with file system module 210, includes the commands for application 104 to communicate with memory card 116 or for the memory card to communicate with the application. For example, application driver module 214 may receive commands from application 104 and translate the received commands into commands for memory card 116. It should be noted that program instruction driver 106 may interface with memory card 116 that is secured (i.e., a secured memory card). There are a variety of secured memory cards, examples being sold under the trademarks Secure Digital, MultiMediaCard, MiniSD, MicroSD, and other secured memory cards. To interface with memory card 116 that is secured, application driver module 214, for example, may include a secure storage application (SSA) driver module. In communication with application driver module 214 is device driver module 212. Device driver module 212 is configured to interface application driver module 214 with memory card 116. Device driver module 212 may, for example, include the lower-level interface functions to communicate with memory card 116. An example of a lower-level interface function include input/out functions associated with input and output of data to and from memory card 116.

Figure 3:
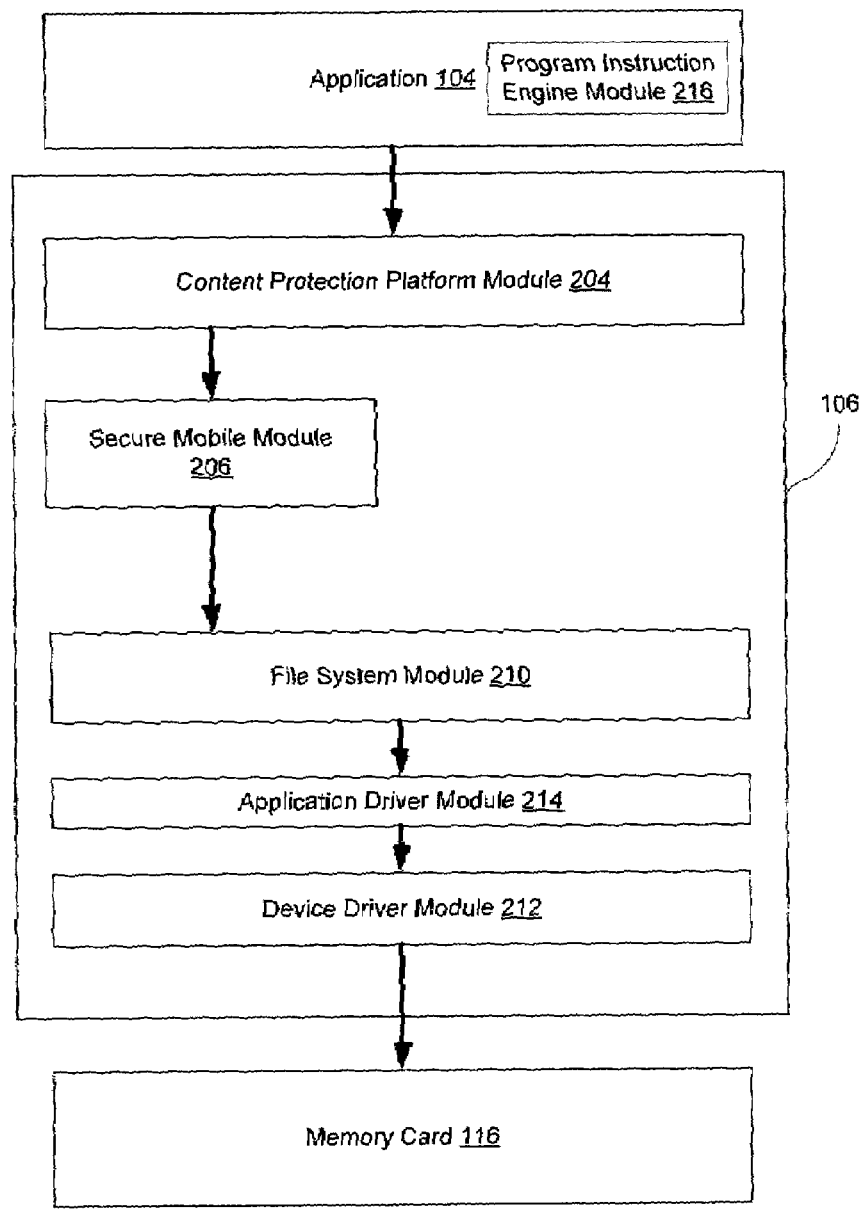
FIG. 3 is a simplified block diagram of a program instruction driver for interfacing with a memory card, in accordance with another embodiment of the invention.

It should be appreciated that in other embodiments, program instruction driver 106 may include fewer or more modules apart from those shown in FIG. 2. For example, device driver module 212 may not include application driver module 214. In another example, as shown in FIG. 3, program instruction driver 106 can include content protection platform module 204, secure mobile module 206, file system module 210, device driver module 212, and application driver module 214, but not a program instruction engine module and a digital rights management module. Instead, program instruction engine module 216 is integrated into application 104. Here, program instruction driver 106 reads the program instructions from memory card 116 and transmits the program instructions to application 104 for interpretation and execution. Program instruction engine module 216 may also be integrated into file system module 210 or application driver module 214.

Figure 4:
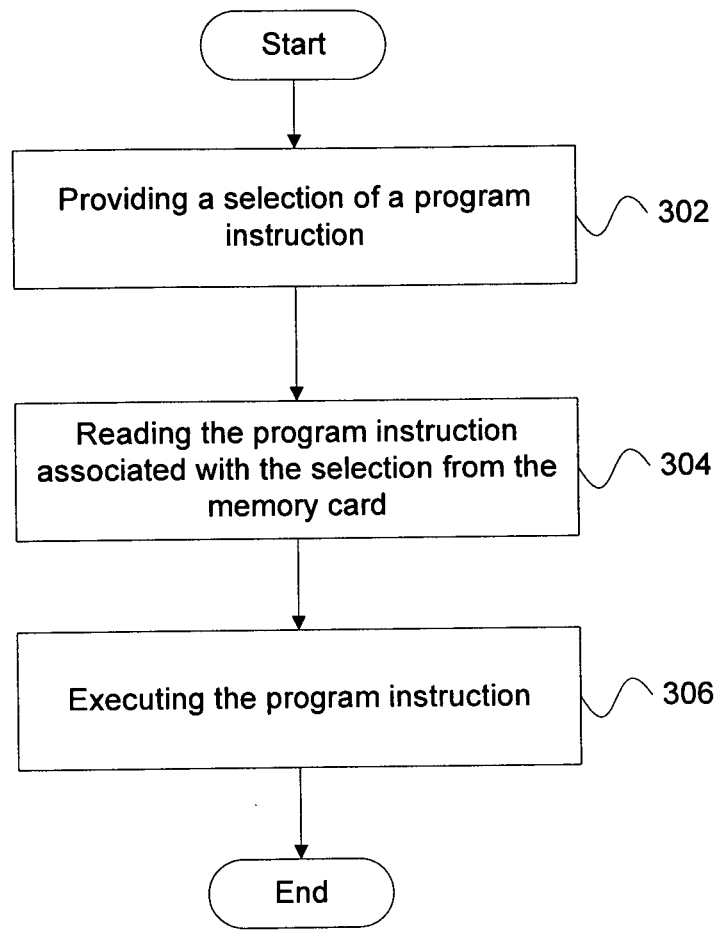
FIG. 4 is a flowchart diagram of a general overview of operations for interfacing with a memory card, in accordance with an embodiment of the invention.

FIG. 4 is a flowchart diagram of a general overview of operations for interfacing with a memory card, in accordance with an embodiment of the invention. As shown in FIG. 4, a selection of a program instruction is provided in operation 302. In an embodiment, as will be explained in more detail below, a user can select the program instruction. In another embodiment, an application may provide the selection of the program instruction.

With the selection of the program instruction provided, the program instruction associated with the selection is read from the memory card in operation 304. In other words, the program instruction is retrieved from the memory card. The program instruction is stored in the memory card and the program instruction may be stored in a variety of data structures. Examples of data structures include tables, arrays, electronic documents, and other data structures. The program instruction, for example, may be stored in the data structures as plain text (e.g., American Standard Code for Information Interchange (ASCII) characters). After the program instruction is read, the program instruction is executed in operation 306.

Figure 5:
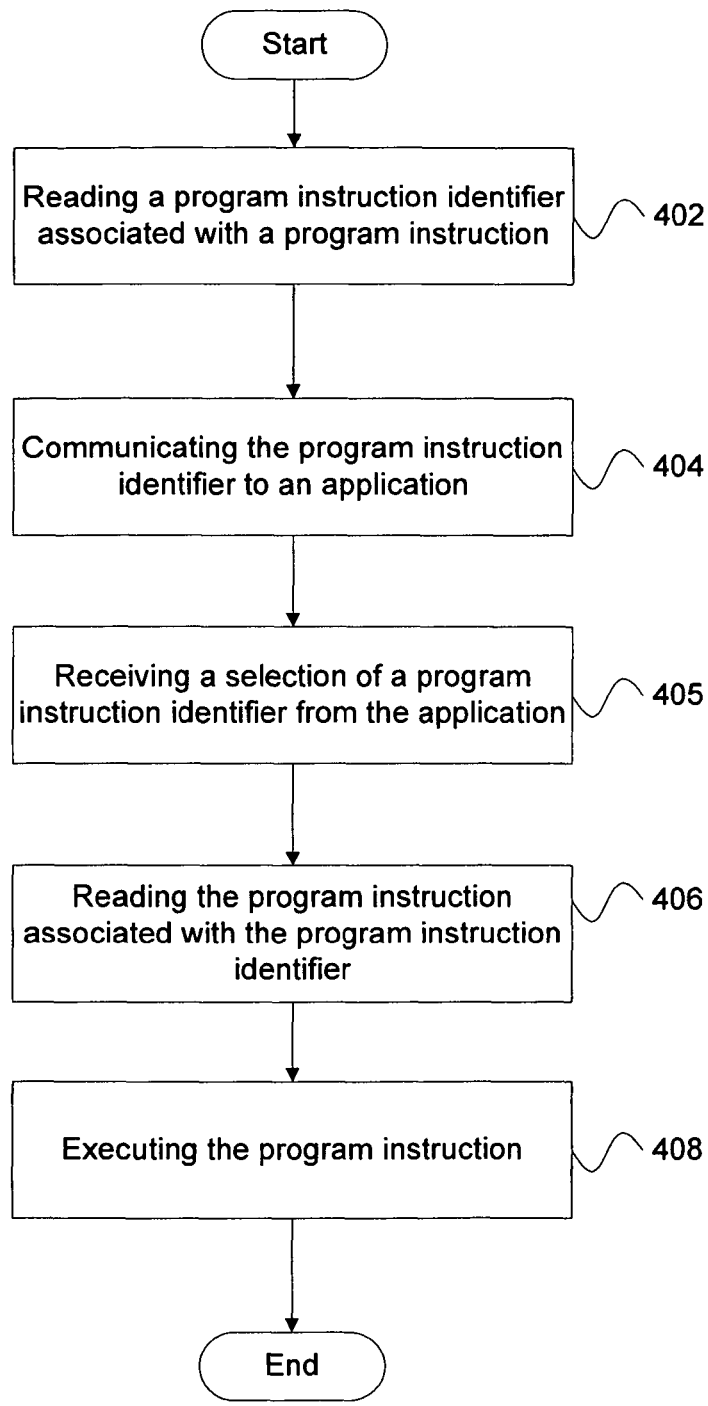
FIG. 5 is a flowchart diagram of operations for interfacing with a memory card, in accordance with an embodiment of the invention.

FIG. 5 is a flowchart diagram of operations for interfacing with a memory card, in accordance with an embodiment of the invention. As shown in FIG. 5, a program instruction identifier associated with a program instruction is read in operation 402 from the memory card. The program instruction identifier identifies the program instruction and, as will be explained in more detail below, the program instruction identifier may be displayed or presented to a user by the host computing device. Program instruction identifiers may include, for example, texts and graphical user interface (GUI) items (e.g., icons, animated icons, and other GUI items). In an embodiment, the program instruction identifier is stored in the data structure along with the script. The following Table A is an example of a data structure that stores program instructions in the form of scripts and associated program instruction identifiers.

TABLE A

| Program instruction identifier | Script |
|---|---|
| American Credit Card Company | |
| Get List of Last Ten Transactions | Send card command xxx |
| | Send card command xxx get R data |
| | Host display R |
| Get List of Last Five Transactions | Send card command xxx |
| | Send card command xxx get Y data |
| | Host display Y |

The above Table A is organized in rows and columns. Elements associated with the column "script" include the scripts. Elements associated with the column "program instruction identifier" include the program instruction identifiers associated with the scripts. Here, the scripts "send card command xxx," "send card command xxx get R data," and "host display R" are associated with the program instruction identifier "get list of last ten transactions." Similarly, the scripts "send card command xxx," "send card command xxx get Y data," and "host display Y" are associated with the program instruction identifier "get list of last five transactions." It should be noted that program instruction identifiers can be organized into groups and subgroups. For example, as shown in Table A, the program instruction identifiers "get list of last ten transactions" and "get list of last five transactions" are organized into a group identified by program instruction identifier "American Credit Card Company." Accordingly, the scripts shown in Table A are associated with the program instruction identifier "American Credit Card Company" and either the program instruction identifier "get list of last ten transactions" or the program instruction identifier "get list of last five transactions."

After the program instruction identifiers are read from the memory card, the program instruction identifiers are communicated to an application (e.g., an operating system) in operation 404. The application may provide the program instruction identifiers in a GUI for selection. In an embodiment, the application may display the program instruction identifiers in a GUI to a user for selection. For example, the program instruction identifiers may be displayed in a menu as selectable menu items. In general, a menu is a list of commands presented to a user. The user may select one or more program instruction identifiers displayed in the GUI. In other words, the program instruction identifiers are configured to be selected from the GUI. Since program instructions are associated with the program instruction identifiers, a selection of a program instruction identifier provides a selection of the associated program instruction.

Figure 6:
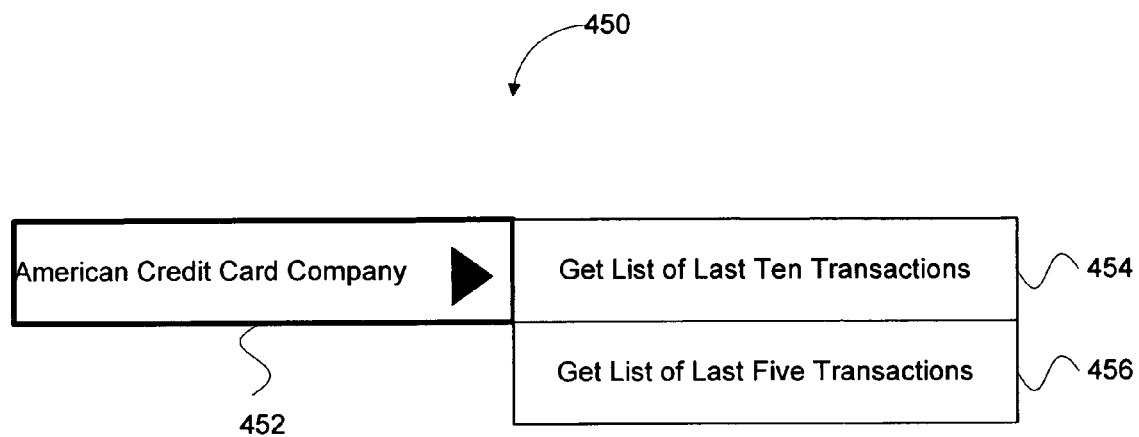
FIG. 6 is a graphical user interface configured to provide a selection of one or more program instruction identifiers, in accordance with an embodiment of the invention.

The program instruction identifiers may be provided in a variety of GUIs. Examples of GUIs include buttons, menus, scroll bars, and other GUIs. FIG. 6 is a GUI configured to provide a selection of one or more program instruction identifiers read from Table A, in accordance with an embodiment of the invention. As shown in FIG. 6, GUI 450 is a set of menus displayed to a user by a host computing device for selection. GUI 450 includes menu region 452 and sub-menu regions 454 and 456. Menu region 452 displays program instruction identifier "American Credit Card Company" read from Table A above. Sub-menu regions 454 and 456 display program instruction identifiers associated with the group "American Credit Card Company." Sub-menu regions 454 and 456 therefore display program instruction identifiers "Get List of Ten Transactions" and "Get List of Last Five Transactions," respectively. Program instruction identifiers from menu region 452 and sub-menu regions 454 and 456 may be selected by a variety of techniques, such as positioning a cursor over menu regions 452, 454, or 456 and clicking a mouse, depressing a key on a keyboard, and other selection techniques.

It should be appreciated that a variety of suitable layouts can be designed for region layouts illustrated above as FIG. 6 does not represent all possible layout options available. The displayable appearance of the regions (e.g., menu regions) can be defined by a variety suitable geometric shapes (e.g., rectangle, square, circle, triangle, and other shapes), alphanumeric characters (e.g., A, v, t, Q, 1, 9, 10, and other characters), symbols (e.g., $, *, ▼, ¤, ♥, and other symbols), shadings, patterns (e.g., solid, hatch, stripes, dots, and other patterns), and colors. Furthermore, for example, sub-menu regions 454 and 456 shown in FIG. 6, or other regions, may be omitted or dynamically assigned. It should also be noted that the regions can be fixed or customizable. Additionally, the host computing device displaying the GUIs may have a fixed set of layouts, utilizes a defined protocol or language to define a layout, or an external structure can be reported to the host computing device that defines a layout.

Returning to FIG. 5, after the program instruction identifiers are communicated to an application, a selection of one or more program instruction identifiers is received in operation 405. Thereafter, the program instruction associated with the selection is read in operation 406 and executed in operation 408. For example, with reference to Table A, if a selection of the program instruction identifier "Get List of Last Ten Transactions" is received, then the associated scripts "send card command xxx," "send card command xxx get R data," and "host display R," are read from the memory card and executed.

Figure 7:
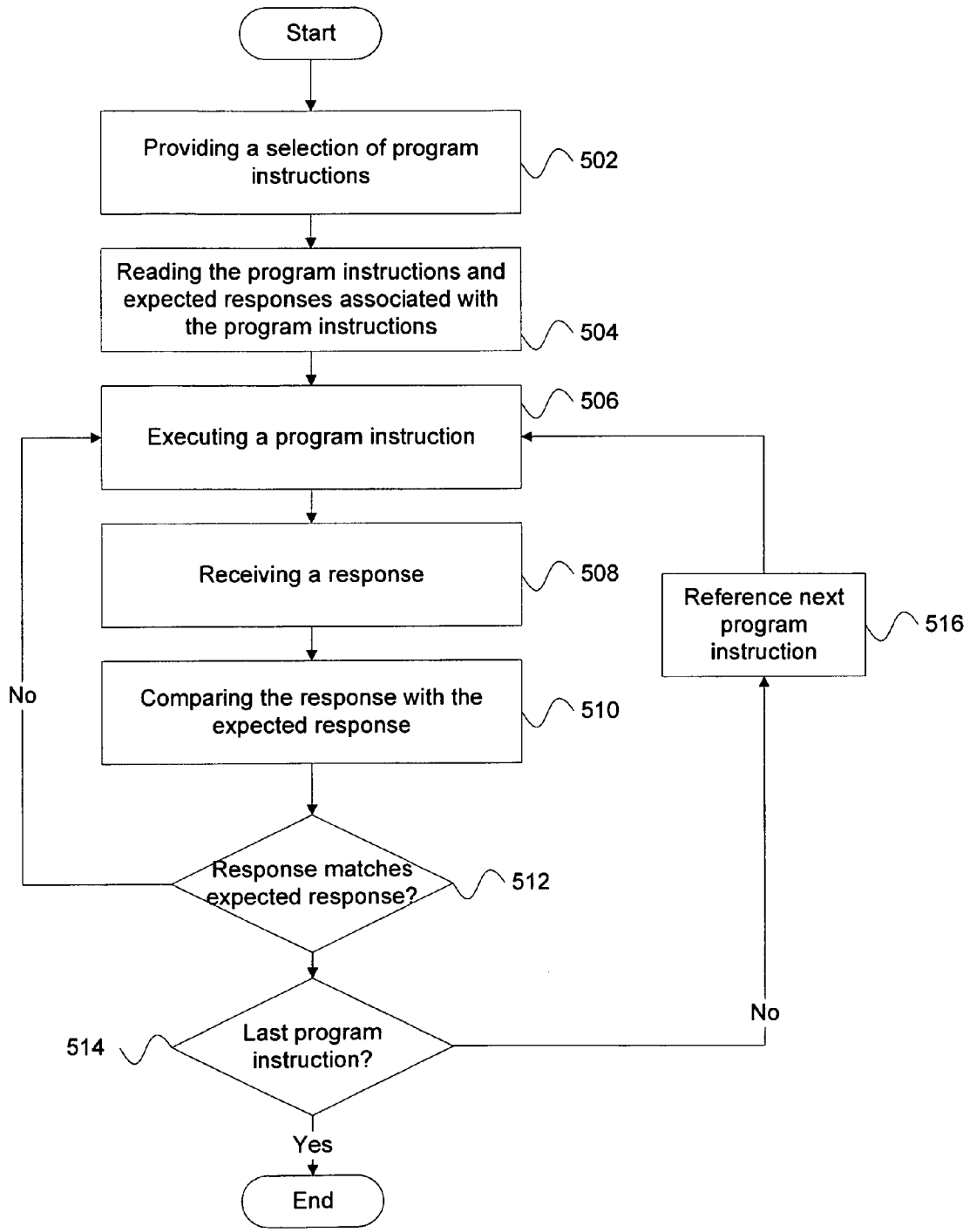
FIG. 7 is a flowchart diagram of operations for interfacing with a memory card, in accordance with another embodiment of the invention.

FIG. 7 is a flowchart diagram of operations for interfacing with a memory card, in accordance with another embodiment of the invention. As shown in FIG. 7, a selection of program instructions is provided in operation 502. As discussed above, a user may provide the selection by way of selecting a program instruction identifier from a GUI. In another embodiment, an application may provide the selection. With the selection, the program instructions and, in an embodiment, the expected responses associated with the program instructions are read from the memory card in operation 504. An expected response is a response expected after the execution of a program instruction. In other words, the expected response is a response considered likely to receive from the execution of a program instruction. For example, a program instruction configured to retrieve a value A is executed. The expected response as a result of the execution of the program instruction is the value A. In an embodiment, the expected responses, along with the program instructions and the program instruction identifiers, can be stored in a data structure. The following Table B is an example of a data structure that stores, program instructions in the form of scripts, associated program instruction identifiers, and associated expected responses.

TABLE B

| Program instruction identifier | Script | Expected Response |
|---|---|---|
| One-time Password Get one-time password from virtual private network | Start authentication: mutual Advanced Encryption Standard (AES) | Rsuccess = card challenge |
| | Use Method x to compute response | |
| | Send command xxx with response | Rsuccess = sessionID and secure channel |
| | Send command xxx/secure | Rsucecss = one-time password value/secure |
| | Host display Rsuccess | |

The above Table B is organized in rows and columns. Elements associated with the column "script" include the scripts. Elements associated with the column "program instruction identifier" include the program instruction identifiers associated with the scripts. Elements associated with the column "expected response" include the expected responses associated with the scripts. For example, as shown in Table B, the expected response "Rsuccess=sessionID and secure channel" is associated with the script "send command xxx with response." In another example, the expected response "Rsuccess=one-time password value/secure" is associated with the script "send command xxx/secure."

After the program instructions and the associated expected response are read from the memory card, one of the program instructions (e.g., a first program instruction) is executed in operation 506. As a result of the execution, a response may be received in operation 508. In an embodiment, if a response is received, the response may be compared with the expected response in operation 510 to determine whether the program instruction was executed correctly. In another embodiment, the response may not be compared with the expected response. As shown in operation 512, if the received response matches the expected response, then a verification is made in operation 514 to determine whether the program instruction is the last program instruction associated with a program instruction identifier. In other words, verification is made in operation 514 to determine whether there are additional unexpected program instructions. If the program instruction is the last program instruction or all the program instructions are executed, then the operation ends. On the other hand, if the program instruction is not the last program instruction, then a next program instruction associated with the program instruction identifier (e.g., a second program instruction) is referenced in operation 516. In other words, the program instruction driver then jumps to an unexecuted program instruction that may located after the executed program instruction. The next program instruction is executed in operation 506 and operations 506, 508, 510, 512, and 514 are repeated for each program instruction associated with the selected program instruction identifier until all the program instructions are executed.

In an illustrative example, the scripts stored in the above-referenced Table B are configured to retrieve a one-time password from a memory card. In general, a one-time password is a password that may be used to access a variety of logon systems. Once the one-time password is used, the one-time password cannot be used again as the logon system expects a new one-time password at the next logon.

The scripts associated with Table B are configured for the host computing device to retrieve one-time passwords from the memory card for use with a virtual private network by the above-described method. In the example of Table B, to retrieve a one-time password, the scripts and expected responses associated with program instruction identifier "get one-time password from virtual private network" are read from Table B. The first script "start authentication: mutual AES" is executed and, as a result, a response is received. The received response is compared with the associated expected response "Rsuccess=card challenge." If the response matches the expected response "Rsuccess=card challenge," then the next script "use method x to compute response" is executed. If the response does not match the expected response, then the execution of the script "start authentication: mutual AES" was not successful. As a result, the script "start authentication: mutual AES" is executed again. The operations described above may be repeated as needed for each script associated with the script identifier "get one-time password from virtual private network" such that a one-time password value is retrieved from the memory card for use with a virtual private network.

Figure 8:
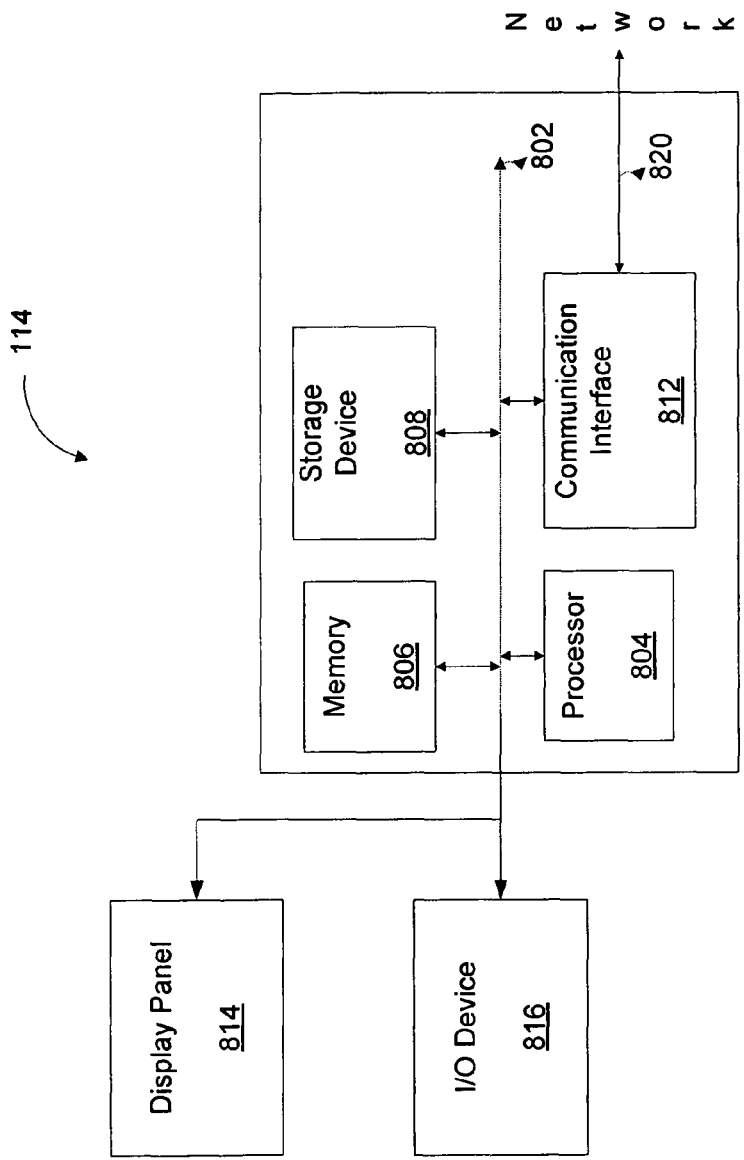
FIG. 8 is a simplified block diagram of a general overview of a host computing device suitable for hosting a program instruction driver and interfacing with a memory card, in accordance with an embodiment of the invention.

FIG. 8 is a simplified block diagram of a general overview of a host computing device suitable for hosting a program instruction driver and interfacing with a memory card, in accordance with an embodiment of the invention. In some embodiments, host computing device 114 may be used to implement computer programs, logic, applications, methods, processes, or other software to interface with a memory card and execute program instructions stored on the memory card. In an embodiment, host computing device is portable. Examples of a portable computing device, such as host computing device 114, include mobile phones, personal digital assistants, digital audio players, handheld game consoles, and other portable computing devices. As shown in FIG. 8, host computing device 114 includes bus 802 or other communication mechanism for communicating information, which interconnects subsystems and devices, such as processor 804, memory 806 (e.g., random access memory (RAM)), storage device 808 (e.g., read only memory (ROM), magnetic disk drives, optical disk drives, and other storage devices), communication interface 812 (e.g., modem or Ethernet card), display panel 814 (e.g., liquid crystal display (LCD)), and input/output device 816 (e.g., keypad, trackball, mouse, and other I/O devices).

In some embodiments, host computing device 114 performs operations by processor 804 when executing one or more sequences of one or more program instructions stored in memory 806. Such program instructions may be read into memory 806 from another computer readable medium, such as storage device 808. In some embodiments, hard-wired circuitry may be used in place of or in combination with software program instructions to implement embodiments of the invention.

It should be appreciated that the term "computer readable medium" refers to suitable medium that participates in providing program instructions to processor 804 for execution. Such a medium may take many forms, including but not limited to, non-volatile media, volatile media, and transmission media. Non-volatile media may include, for example, optical or magnetic disks, such as storage device 808. Volatile media may include dynamic memory, such as memory 806. Transmission media includes coaxial cables, copper wire, and fiber optics, including wires that comprise bus 802. Transmission media can also take the form of acoustic or light waves, such as those generated during radio wave and infrared data communications. Common forms of computer readable media includes, for example, magnetic mediums (e.g., floppy disk, flexible disk, hard disk, and other magnetic mediums), optical mediums (e.g., compact disc read-only memory (CD-ROM) and other optical mediums), memory chips, memory cards, or cartridges (e.g., RAM, programmable read-only memory (PROM), erasable programmable read-only memory (EPROM), flash memory, and other memory chips, cards, or cartridges), carrier waves, and any other medium from which host computing device 114 can read.

In some embodiments, execution of the sequences of program instructions to practice the embodiments may be performed by a single host computing device 114. In other embodiments, two or more host computing devices, such as host computing device 114, coupled by communication link 820 (e.g., local area network (LAN), public switched telephone network (PSTN), wireless network, and other communication links) may perform the sequence of program instructions to practice the embodiments in coordination with one another. In addition, host computing device 114 may transmit and receive messages, data, and instructions, including program, i.e., application code, through communication link 820 and communication interface 812. Received program instructions may be executed by processor 804 as the program instructions are received, and/or stored in storage device 808, or other non-volatile storage for later execution.

Figure 9:
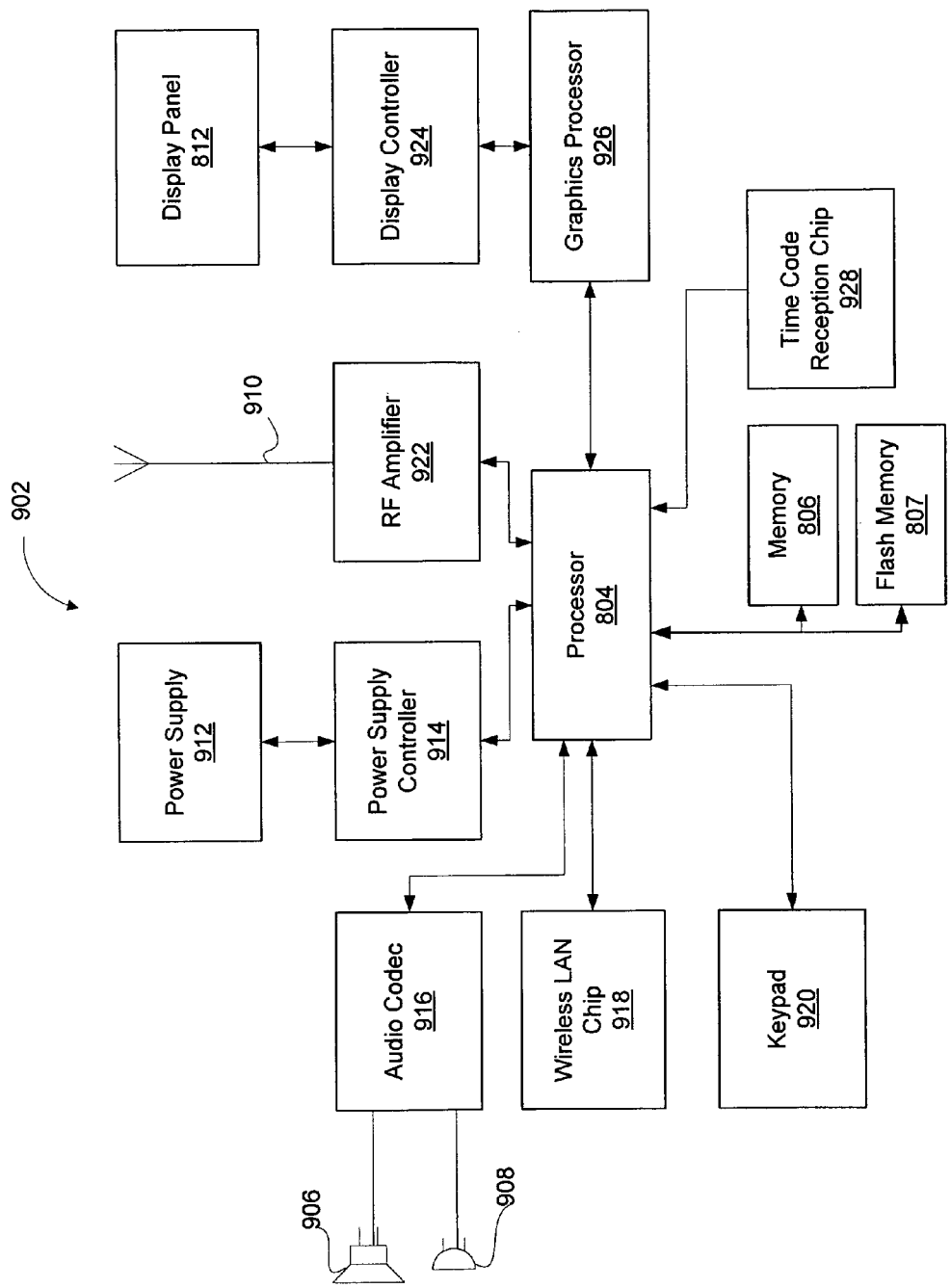
FIG. 9 is a simplified block diagram of the host computing device as a mobile phone suitable for hosting a program instruction driver and interfacing with a memory card, in accordance with an embodiment of the invention.

FIG. 9 is a simplified block diagram of the host computing device as a mobile phone suitable for hosting a program instruction driver and interfacing with a memory card, in accordance with an embodiment of the invention. As shown in FIG. 9, mobile phone 902 includes processor 804 in communication with audio codec 916, wireless LAN chip 918, keypad 920, power supply controller 914, radio frequency (RF) amplifier 922, memory 806, storage device 807, time code reception chip 928, and graphics processor 926. Speaker 906 and microphone 908 are connected to audio codec 916. Antenna 910 is connected to RF amplifier 922. Graphics processor 926 is in communication with display controller 924 and display panel 812 is in communication with the display controller.

Storage device 807, which is in communication with memory 806 and processor 804, may include a variety of memories for storing program instruction driver and an application. Examples of storage device 807 include a ROM, a flash memory, and other memories. In an embodiment, the application (e.g., an operating system) and the program instruction driver are stored in a ROM. The program instruction driver may be loaded into memory 806 and processor 804, which is in communication with memory 806, can execute one or more program instructions associated with the program instruction driver stored in the memory. For example, in an embodiment, processor 804 may execute program instructions for providing a selection of a program instruction, reading the program instruction from a memory card (not shown), and executing the program instruction.

Power supply 912 may be connected to processor 804 by way of power supply controller 914. Power supply 912 is configured to generate a voltage and supply power to mobile phone 902. Examples of power supply 912 include batteries, solar panels, and other power supplies. Power supply controller 914 is configured to regulate the voltage provided by power supply 912 and to supply a regulated voltage to processor 804. For example, power supply controller 914 can regulate a 4.5V from power supply 912 to 3.0V and can include a charge pump to step up that 3.0V to 10V.

Mobile phone 902 may additionally include display panel 812. Display panel 812 can be configured to display the GUI that provides a selection of one or more program instruction identifiers. For example, in an embodiment, display panel 812 can be configured to display the program instruction identifiers in a menu. Display panel 812 is in communication display controller 924. In general, display controller 924 is configured to output an image signal to display panel 812 in response to image data received from graphics processor 926. Graphics processor 926, which is in communication with display controller 924, is configured to render graphics for display on display panel 812. Graphics processor 926 can include a geometry and rendering engine to process and accelerate two and dimensional graphics.

Processor 804 can additionally be in communication with time code reception chip 928 that is configured to derive a time code from long-wave standard broadcasts and to communicate the time code to the processor. Additionally connected to processor 804 is radio-frequency (RF) amplifier 922 for amplifying RF signals received by antenna 910. Audio codec 916, which is in communication with processor 804, is configured to encode audio signals received from microphone 908 or to decode audio signals transmitted to speaker 906. Processor 804 also is in communication with keypad 920 that is configured for the input of text and characters. To communicate with a wireless local area network (LAN), mobile phone may additionally include wireless LAN chip 918.

The above-described embodiments provide methods, systems, and/or computing devices for interfacing with a memory card to access program instructions. By being able to access program instructions stored in a memory card, new functionalities may be added to an application without modifying the application. For example, program instructions stored in the memory card may allow or facilitate communication between the application and the memory card. As an example, to interface with an unsupported memory card with new functionalities, the operating system can read from the memory card a set of program instructions associated with the new functionalities that are not programmed into the operating system. Here, the program instruction may transmit a new set of commands that were not preprogrammed into the operating system. The operating system can execute the program instructions to implement the new functionalities. As a result, for instance, an operating system associated with a mobile phone may interface with new or unsupported memory cards.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A memory card comprising:
    an interface operative to communicate with a host computing device;
    a memory storing a program instruction, wherein the program instruction is configured to add to an existing command set of the host computing device a new set of commands with which to interface with the memory card when the program instruction is executed by the host computing device, wherein the new set of commands are not known to the host computing device prior to executing the program instruction; and
    a memory controller in communication with the interface and the memory, wherein the memory controller is operative to:
        receive a request for the program instruction from the host computing device; and
        send the requested program instruction and an expected response associated with one of the new set of commands to the host computing device, the expected response comprising a one-time password;
    wherein the host computing device is configured to:
        compare the expected response comprising the one-time password to the requested program instruction with an actual response received in conjunction with execution of the requested program instruction to determine whether the requested program instruction was executed correctly;
        determine whether to retry a command based on the determination of whether the requested program instruction was executed correctly;
        determine whether there are additional program instructions for execution upon a determination that the requested program instruction was executed correctly; and
        determine whether to reference a next command based on the determination of whether there are additional program instructions for execution.

2. The memory card of claim 1, wherein the memory further stores a program instruction identifier associated with the program instruction, and wherein the memory controller is further operative to provide the program instruction identifier to the host computing device for selection.

3. The memory card of claim 2, wherein the selection is performed via a graphical user interface on the host computing device.

4. The memory card of claim 1, wherein the program instruction is stored in a data structure in the memory.

5. The memory card of claim 4, wherein the data structure comprises a program instruction identifier associated with the program instruction.

6. The memory card of claim 1, wherein the program instruction is a script.

7. A method for interfacing with a host computing device, the method comprising:
    performing by a memory card in communication with a host computing device, wherein the memory card comprises a memory storing a program instruction, wherein the host computing device is operative to interface with the memory card using a first set of commands, wherein the program instruction is configured to add to an existing command set of the host computing device a new set of commands with which to interface with the memory card when the program instruction is executed by the host computing device, wherein the new set of commands are not known to the host computing device prior to executing the program instruction:
        receiving a request for the program instruction from the host computing device; and
        sending the requested program instruction and an expected response associated with one of the new set of commands to the host computing device, the expected response comprising a one-time password;
    wherein the host computing device:
        compares the expected response comprising the one-time password to the requested program instruction with an actual response received in conjunction with execution of the requested program instruction to determine whether the requested program instruction was executed correctly;

determines whether to retry a command based on the determination of whether the requested program instruction was executed correctly;

determines whether there are additional program instructions for execution upon a determination that the requested program instruction was executed correctly; and determines whether to reference a next command based on the determination of whether there are additional program instructions for execution.

8. The method of claim 7, wherein the memory further stores a program instruction identifier associated with the program instruction, and wherein the method further comprises providing the program instruction identifier to the host computing device for selection.

9. The method of claim 8, wherein the selection is performed via a graphical user interface on the host computing device.

10. The method of claim 7, wherein the program instruction is stored in a data structure in the memory.

11. The method of claim 10, wherein the data structure comprises a program instruction identifier associated with the program instruction.

12. The method of claim 7, wherein the program instruction is a script.

* * * * *

UNITED STATES PATENT AND TRADEMARK OFFICE
CERTIFICATE OF CORRECTION

| | | |
|---|---|---|
| PATENT NO. | : 8,719,709 B2 | Page 1 of 1 |
| APPLICATION NO. | : 11/509978 | |
| DATED | : May 6, 2014 | |
| INVENTOR(S) | : Jogand-Coulomb et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this
Eleventh Day of August, 2015

Michelle K. Lee
*Director of the United States Patent and Trademark Office*